US008819160B2

(12) United States Patent
Oya et al.

(10) Patent No.: US 8,819,160 B2
(45) Date of Patent: *Aug. 26, 2014

(54) NETWORK-CONNECTABLE DEVICE AND METHOD FOR MANAGING POWER THEREOF

(75) Inventors: Makoto Oya, Aichi (JP); Satoru Goto, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 447 days.

This patent is subject to a terminal disclaimer.

(21) Appl. No.: 12/265,275

(22) Filed: Nov. 5, 2008

(65) Prior Publication Data

US 2009/0132700 A1   May 21, 2009

(30) Foreign Application Priority Data

Nov. 5, 2007  (JP) ................... P2007-287170

(51) Int. Cl.
  *G06F 15/16* (2006.01)
(52) U.S. Cl.
  USPC ..................... 709/208; 709/209; 709/210
(58) Field of Classification Search
  USPC .......................................... 713/300
  See application file for complete search history.

(56) References Cited

U.S. PATENT DOCUMENTS

| 4,809,163 | A | 2/1989 | Hirosawa et al. | |
|---|---|---|---|---|
| 6,021,429 | A * | 2/2000 | Danknick | 709/208 |
| 6,199,133 | B1 * | 3/2001 | Schnell | 710/110 |
| 6,381,700 | B1 * | 4/2002 | Yoshida | 726/4 |
| 6,928,470 | B1 | 8/2005 | Hamlin | |
| 7,124,177 | B2 * | 10/2006 | Watanabe | 709/223 |
| 7,424,733 | B2 * | 9/2008 | Kamiwada et al. | 726/4 |
| 7,447,757 | B2 * | 11/2008 | Muto | 709/223 |
| 7,650,399 | B2 * | 1/2010 | Fukasawa et al. | 709/223 |
| 2001/0013083 | A1 * | 8/2001 | Nakamura | 711/111 |
| 2001/0021981 | A1 * | 9/2001 | Konaka et al. | 713/300 |
| 2003/0110247 | A1 | 6/2003 | Tsushima et al. | |
| 2004/0054747 | A1 * | 3/2004 | Breh et al. | 709/208 |
| 2007/0002838 | A1 * | 1/2007 | Komura et al. | 370/352 |
| 2007/0124440 | A1 * | 5/2007 | Maki | 709/223 |
| 2007/0250723 | A1 * | 10/2007 | Shima et al. | 713/300 |

FOREIGN PATENT DOCUMENTS

| JP | 59-212930 | 12/1984 |
|---|---|---|
| JP | 2-173816 | 7/1990 |
| JP | 5-165552 | 7/1993 |
| JP | 5-173677 | 7/1993 |

(Continued)

OTHER PUBLICATIONS

U.S. Appl. No. 12/265,284, filed Nov. 5, 2008, Oya, et al.

(Continued)

*Primary Examiner* — Umar Cheema
(74) *Attorney, Agent, or Firm* — Oblon, Spivak, McClelland, Maier & Neustadt, L.L.P.

(57) ABSTRACT

A network-connectable device is configured to communicate with one or more computer-related devices via a network. The network-connectable device includes a list management unit and a shutdown unit. When the list management unit receives a start command signal instructing an activation of the network-connectable device which is transmitted from a computer-related device, the list management unit registers the computer-related device on a list. When the computer-related device registered on the list is switched to or is to be switched to a disconnected state disconnected from the network-connectable device, the list management unit deletes the computer-related device from the list. The shutdown unit shuts down power to a part of the network-connectable device when none of the computer-related devices is registered on the list.

13 Claims, 9 Drawing Sheets

(56) References Cited

FOREIGN PATENT DOCUMENTS

| JP | 7-195801 A | 8/1995 |
|---|---|---|
| JP | 11-31030 | 2/1999 |
| JP | 2001-209464 | 8/2001 |
| JP | 2004-151824 | 5/2004 |
| JP | 2004-199477 | 7/2004 |
| JP | 2004-252500 A | 9/2004 |
| JP | 2005-004646 | 1/2005 |
| JP | 2005-275818 | 10/2005 |
| JP | 2007-68105 A | 3/2007 |

OTHER PUBLICATIONS

U.S. Appl. No. 12/130,576, filed May 30, 2008, Makoto Oya.
Japanese Office Action Issued May 15, 2012 in Patent Application No. 2010-106958 (with English translation).

\* cited by examiner

NETWORK-CONNECTABLE DEVICE AND METHOD FOR MANAGING POWER THEREOF

CROSS-REFERENCE TO RELATED APPLICATIONS

This application is based on and claims the priority from Japanese Patent Application No. 2007-287170 filed on Nov. 5, 2007, the entire contents of which are incorporated herein by reference.

TECHNICAL FIELD

The present invention relates to, in an environment where one or more computer-related devices are configured to communicate with a common device via wired or wireless network, an improvement in a technique for managing power of the device.

BACKGROUND

There is an environment where a plurality of computer-related devices can communicate with a common device via a wired or wireless network. In the specification, the "computer-related device" includes all types of electrical appliances that implement given functions by use of a computer. Specifically, the computer-related device includes digital home electrical appliances such as personal computers and television sets but is not limited thereto.

An example of a device used in this kind of communication environment includes NAS (network-attached storage). JP-A-2004-151824 describes an example of technique constituting the network including such an NAS. The entirety of the publication is incorporated herein by reference.

Generally, the NAS includes a data-recordable hard disk and a motor for driving the hard disk. The motor is driven by electric power supplied from a power source.

In general, there is a need for a power saved and/or silenced device by reducing wasteful operations of the device, regardless of the environment in which the device is used. The environment includes: an environment in which a plurality of computer-related devices communicate with the device (a common device) via a wired or wireless network (hereinafter referred to as a "network-connected environment") or an environment where each of the computer-related devices individually and directly connected to corresponding one of the devices (hereinafter referred to as an "individually-connected environment").

For example, when the device is the NAS including a cooling fan for cooling the motor, reduction of wasteful operations leads to not only a reduction in power consumption but also silencing due to the reduction of wasteful operations of the cooling fan.

When the device is used in the individually-connected environment, power of the device can be appropriately management by monitoring the state (an operative state or an inoperative state) of the corresponding computer-related device and controlling the power state of the device in response to the monitored results.

However, when the device is used in the network-connected environment, the device is shared by a plurality of computer-related device. Therefore, the appropriate power management of the device used in the network-connected environment is hardly realized by only a technique employed in the individually-connected environment.

SUMMARY

The present invention was made in consideration of the above circumstances and an object thereof is to provide an improved technique of power management of a network-connectable device that is common to and capable of communicating with a plurality of computer-related devices via a wired or wireless network.

According to an aspect, the present invention provides a network-connectable device configured to communicate with one or more computer-related devices via a network, said network-connectable device comprising: a list management unit configured to: when the list management receives a start command signal instructing an activation of the network-connectable device which is transmitted from a computer-related device, register the computer-related device on a list; and when the computer-related device registered on the list is switched to or is to be switched to a disconnected state disconnected from the network-connectable device, delete the computer-related device from the list; and a shutdown unit configured to shut down power to a part of the network-connectable device when none of the computer-related devices is registered on the list.

According to another aspect, the invention provides a method for managing power of a network-connectable device from a computer-related device connected thereto via a network, the network-connectable device comprising: a list management unit configured to: when the list management receives a start command signal instructing the network-connectable device to activate which is transmitted from a computer-related device, register the computer-related device on a list; and when the computer-related device registered on the list is switched to or is to be switched to a disconnected state disconnected from the network, delete the computer-related device from the list; and a shutdown unit configured to shut down power to a part of the network-connectable device when none of the computer-related devices is registered on the list, said method comprising: transmitting the start command signal from the computer-related device to the network-connectable device during operations of the computer-related device to allow the network-connectable device to register the computer-related device on the list.

According to still another aspect, the present invention provides a power management method for a network-connectable device configured to communicate with one or more computer-related devices via a network, said method comprising: when the list management receives a start command signal instructing the network-connectable device to activate which is transmitted from a computer-related device, registering the computer-related device on a list; and when the computer-related device registered on the list is switched to or is to be switched to a disconnected state disconnected from the network, deleting the computer-related device from the list; and shutting down power to a part of the network-connectable device when none of the computer-related devices is registered on the list.

DESCRIPTION

Figure 1:
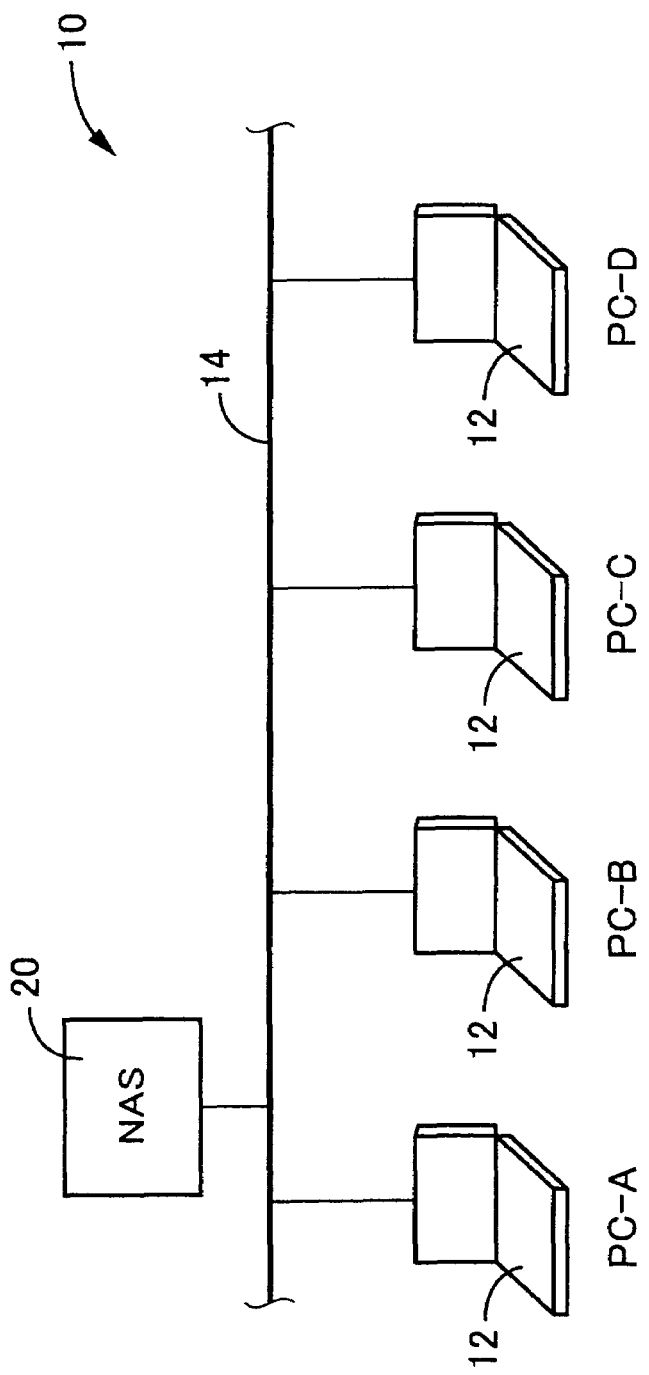
FIG. 1 is a schematic diagram showing a network system using a NAS (Network-Attached Storage) as a network-connectable device according to a first embodiment of the present invention.

The following aspects of the invention are provided. Each of the aspects is divided into sections, and the sections are assigned numerals. The aspects are described by citing numerals assigned to other sections. This is intended for making it easy to comprehend portions of technical features and combinations thereof that can be adopted by the aspects of the present invention. It should not be construed that technical features and their combinations, which can be adopted by the present invention, be limited to the following aspects. Specifically, it should be interpreted that, though not described in the following aspects, extracting and adopting technical features described in this application as technical features of the present invention is not impeded.

Moreover, describing sections by citing numerals assigned to other sections does not always mean hindrance of separation and independence of technical features provided in respective sections from technical features provided in other sections. It should be construed that the technical features provided in the respective sections can be made independent, as required, according to the features.

(1) A network-connectable device configured to communicate with one or more computer-related devices via a network, said network-connectable device comprising: a list management unit configured to: when the list management unit receives a start command signal instructing an activation of the network-connectable device which is transmitted from a computer-related device, register the computer-related device on a list; and when the computer-related device registered on the list is switched to or is to be switched to a disconnected state disconnected from the network-connectable device, delete the computer-related device from the list; and a shutdown unit configured to shut down power to a part of the network-connectable device when none of the computer-related devices is registered on the list. The list management unit may delete the computer-related device from the list when the computer-related device is shut down or is to be shut down.

When the network-connectable device shifts to a state where none of the computer-related devices are registered in the list; namely, when the network-connectable device shifts to a state where all of the computer-related devices have shifted to a shutdown state or are attempting to shift to a shutdown state, the main power of the network-connectable device is shut down.

Specifically, the network-connectable device (is deactivated) shifts from an operating state to a halt state so as to be synchronized with changes in operating states of the plurality of computer-related devices sharing the network-connectable device.

Consequently, in the network-connectable device, when any of the plurality of computer-related devices sharing a single network-connectable device is in operation, there is prevented transition of the network-connectable device to a halt state despite operation of any computer-related device, which would otherwise eventually cause an unsuccessful access from the computer-related device, which is in operation, to the network-connectable device.

Further, when all of the computer-related devices sharing a single network-connectable device are in a shutdown state, the network-connectable device shifts from an operating state to a halt state, and hence wasteful operation of the network-connectable device is omitted.

The network-connectable device intensively monitors operating states of the plurality of computer-related devices that share the device, thereby obviating a necessity for each of the computer-related devices to monitor operating states of the other computer-related devices for monitoring power of the network-connectable device.

In the present patent application, unless otherwise specified, a term "computer-related device" can be construed to mean; for instance, a desktop computer (e.g., a personal computer), a portable computer (e.g., a server, a client computer, a PDA, or a portable cellular phone), or a digital home electrical appliance having a function for establishing communication with the network-connectable device. However, the computer-related device is not limited thereto.

In the present patent application, a term "start command signal" can be construed to mean a signal; for instance, a signal that commands the network-connectable device to turn on both the main power and the standby power or a signal that commands activation of only the main power while the standby power of the network-connectable device is held in an ON state, thereby starting the movable portion (e.g., a motor) of the device. However, the term is not limited to the signals.

In the present patent application, the term "start command signal" can be defined as; for instance, a signal specifically designed for activating a network-connectable device or a signal having another function (e.g., an ordinary signal to be input to an interface so as to request respective computer-related devices to make an access to the network-connectable device). However, the term is not limited thereto.

(2) The network-connectable device according to (1), wherein each of the computer-related devices transmits the start command signal to the network-connectable device during operation of the corresponding computer-related device.

(3) The network-connectable device according to (1) or (2), wherein the list management unit comprises a first determination/deletion unit configured to: when the list management unit receives a disconnection notification signal (e.g., shutdown notification signal) transmitted from a computer-related device which indicates that the computer-related device is to be shut down, determine that the computer-related device is to be switched to be shut down; and delete the computer-related device outputting the notification signal from the list.

Transmission of the shutdown notification signal (i.e., an example of the disconnection notification signal) from each of the computer-related devices means that the computer-related device is to be shut down soon. If the computer-related device is shut down, it will be impossible for the computer-related device to subsequently keep using the network-connectable device in spite of shutdown.

Therefore, the "disconnection (shutdown) notification signal" of the section can be interpreted as a signal that allows or commands the network-connectable device to be shut down (deactivated). Specifically, the "shutdown notification signal" can be defined as a stop command signal for commanding deactivation of the network-connectable device.

In the present patent application, a term "stop command signal" can be construed to mean; for instance, a signal that commands deactivation of a movable portion of the device (e.g., a motor) by disconnecting only the main power and without disconnection of a standby power for the network-connectable device, such as a sleep mode command signal. However, the term is not limited to such signal.

In the present patent application, a term "stop command signal" can be defined as; for instance, a signal specifically designed for deactivating the network-connectable device or a signal having another function. However, the term is not limited to them.

(4) The network-connectable device according to (3), wherein each of the computer-related devices transmits the shutdown notification signal to the network-connected device when the corresponding computer-related device is going to be shut down.

(5) The network-connectable device according to any of (1) to (4), wherein the start command is periodically transmitted by each of the computer-related devices during operations thereof, wherein the list management unit comprises a second determination/deletion unit configured to: when the start command signal from the computer-related device registered on the list is not received over a predetermined time period, determine that the computer-related device is switched to the disconnected state; delete the computer-related device from the list.

The network-connectable device is based on the premise that the respective computer-related devices periodically transmit a start command signal to the network-connectable device, so long as the respective computer-related devices are in normal operation. Therefore, when any of the computer-related devices does not periodically transmit a start command signal, the network-connectable device can determine the computer-related device not to require usage of the network-connectable device or to be impossible to use the same.

Therefore, the network-connectable device obviates a necessity to depend on the shutdown notification signal to be transmitted from the respective computer-related devices for the purpose of managing the power of the network-connectable device.

The network-connectable device can be implemented in a aspect where, so long as there is fulfilled at least one of two conditions; namely, a condition of the respective computer-related devices having transmitted the shut-down notification signals and a condition of periodic transmission of a start signal being not performed, the network-connectable device can determine that the respective computer-related devices will not use the network-connectable device thereafter.

In the present aspect, a determination as to whether or not the respective computer-related devices do not need to use the network-connectable device and a determination as to whether or not the network-connectable device should be shut down can be made in a more redundant manner when compared with the aspect such that the respective computer-related devices are determined that the devices will not use the network-connectable device thereafter, unless the respective computer-related devices fulfill the condition that the devices had transmitted the shutdown notification signals. Hence, the reliability of the determination can be readily enhanced.

Therefore, according to the present aspect, it is possible to avoid a case such that the network-connectable device should be shut down but hasn't due to any of the computer-related devices failing to transmit a shutdown notification signal.

(6) The network-connected device according to (5), wherein each of the computer-related device periodically transmits the start command signal to the network-connectable device during operations of the corresponding computer-related device.

(7) The network-connectable device according to any of (1) to (6), further comprising a power-on unit configured to turn on the power when a computer-related device is registered on the list on which no computer-related has been registered.

In the network-connectable device, when the start command signal is first transmitted from a certain computer-related device to the network-connectable device in synchronism with power-on operation of the certain computer-related device, the certain computer-related device is registered in the list as the first computer-related device. As a result, the network-connectable device shifts from a halt state to an operating state.

Specifically, the network-connectable device shifts from a halt state to an operating state (is activated) so as to be synchronized with transition of states of the plurality of computer-related devices.

Therefore, when any of the plurality of computer-related devices sharing a single network-connectable device is in operation, it is possible to prevent a case where the network-connectable device is kept in a halt state despite any computer-related device being in operation, which results in an unsuccessful access from the computer-related device in operation to the network-connectable device.

Further, when all of the computer-related devices sharing a single network-connectable device are shut down, the network-connectable device is held in a halt state, and hence wasteful operation of the network-connectable device is omitted.

(8) The network-connectable device according to any of (1) to (7), further comprising a motor as a drive source. The shutdown unit may shutdown the power to the motor.

(9) The network-connectable device according to any of (1) to (8), further comprising a storage device that comprises a data-recordable hard disk driven by the motor.

(10) The network-connectable device according to any of (1) to (9), further comprising a reproducing device configured to reproduce an image or a sound. The shutdown unit may shutdown the reproducing device.

(11) The network-connectable device according to any of (1) to (10), wherein the computer-related devices comprise at least one of a desktop computer, a portable computer and a digital home electrical appliance.

(12) A program executed by a computer of each of the computer-related devices to implement the network-connectable device according to any of (1) to (11).

(13) A program executed by a computer of the network-connectable device to implement the network-connectable device according to any of (1) to (11).

In the present patent application, a term "program" can be not only construed to mean a combination of commands to be executed by a computer so as to perform the functions of the programs but also to include files or data which are processed in accordance with respective commands. However, the program is not limited to them.

The "program" can also be embodied so as to attain; for instance, a predetermined objective as a result of being solely executed by a computer or to attain a predetermined objective as a result of being executed by a computer along with another program. However, the program is not limited to them. The program can be composed primarily of data; however, the program is not limited to the data.

(14) A computer-readable recording medium having recorded thereon the program according to (12) or (13).

The recording medium can adopt various forms. For instance, there can be adopted any one of a magnetic recording medium such as a flexible disk; an optical recording medium such as a CD or a CD-ROM; a magneto-optical recording medium such as an MO; an unremovable storage such as ROM, and the like. However, the recording medium is not limited to them.

Illustrative embodiments of the present invention will be described in detail with reference to the drawings.

FIG. 1 is a schematic diagram showing a network system 10 using a network-connectable device according to a first embodiment of the present invention.

In the network system 10, four personal computers (hereinafter abbreviated as "PCs") 12 are connected to allow communication with one another via a wireless or wired network 14 (e.g., a LAN (Local Area Network), a WAN (Wide Area Network, the Internet, etc).

The PCs 12 are used by respective users. The respective PCs 12 are distinguished from one another by designations as "PC-A," "PC-B," "PC-C" and "PC-D."

A NAS (Network-Attached Storage) 20 is connected to the network 14. The NAS 20 is shared by four PCs 12. Therefore, the NAS 20 is accessible from any of the PCs 12.

Figure 2:
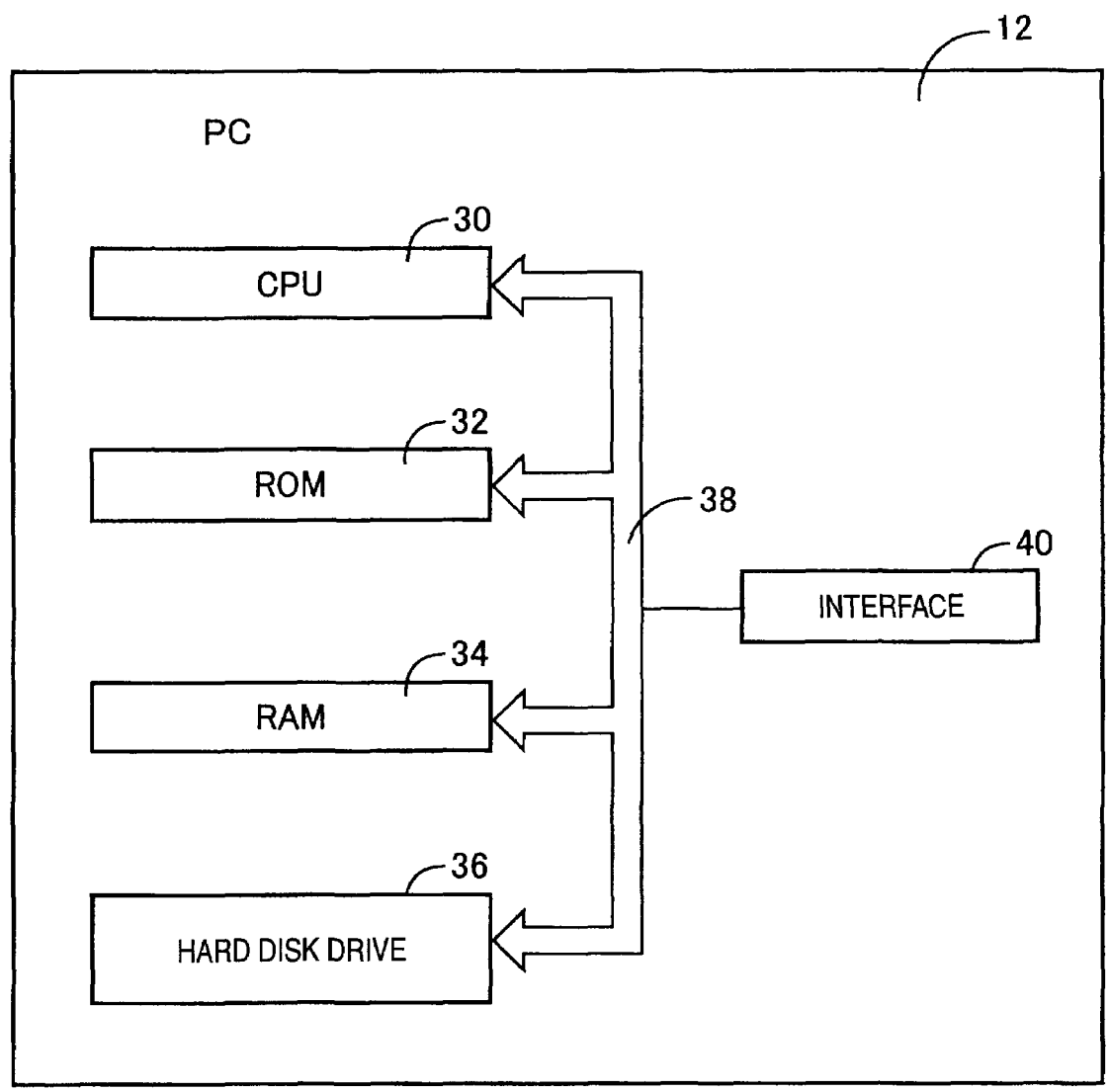
FIG. 2 is a block diagram schematically showing the hardware configuration of a typical one of four PCs (Personal Computers) shown in FIG. 1.

FIG. 2 is a schematic block diagram showing a hardware structure of a typical one of the four PCs 12. The PC 12 includes a CPU (Central Processing Unit; an example of a processor) 30, ROM (Read Only Memory; an example of nonvolatile memory serving as an example of the memory) 32, RAM (RandomAccess Memory; an example of volatile memory serving as another example of memory) 34 and a hard disk drive 36, which are interconnected via a bus 38.

A program for building an operation system in the PC 12 and various application programs are previously stored in the ROM 32. The hard disk drive 36 can install a program, such as a required application program, by use of an external storage medium or on-line.

The PC 12 further includes an interface 40 connected to the bus 38. The PCs 12 can be connected with the network 14, a peripheral device, and an external device via the interface 40.

Figure 3:
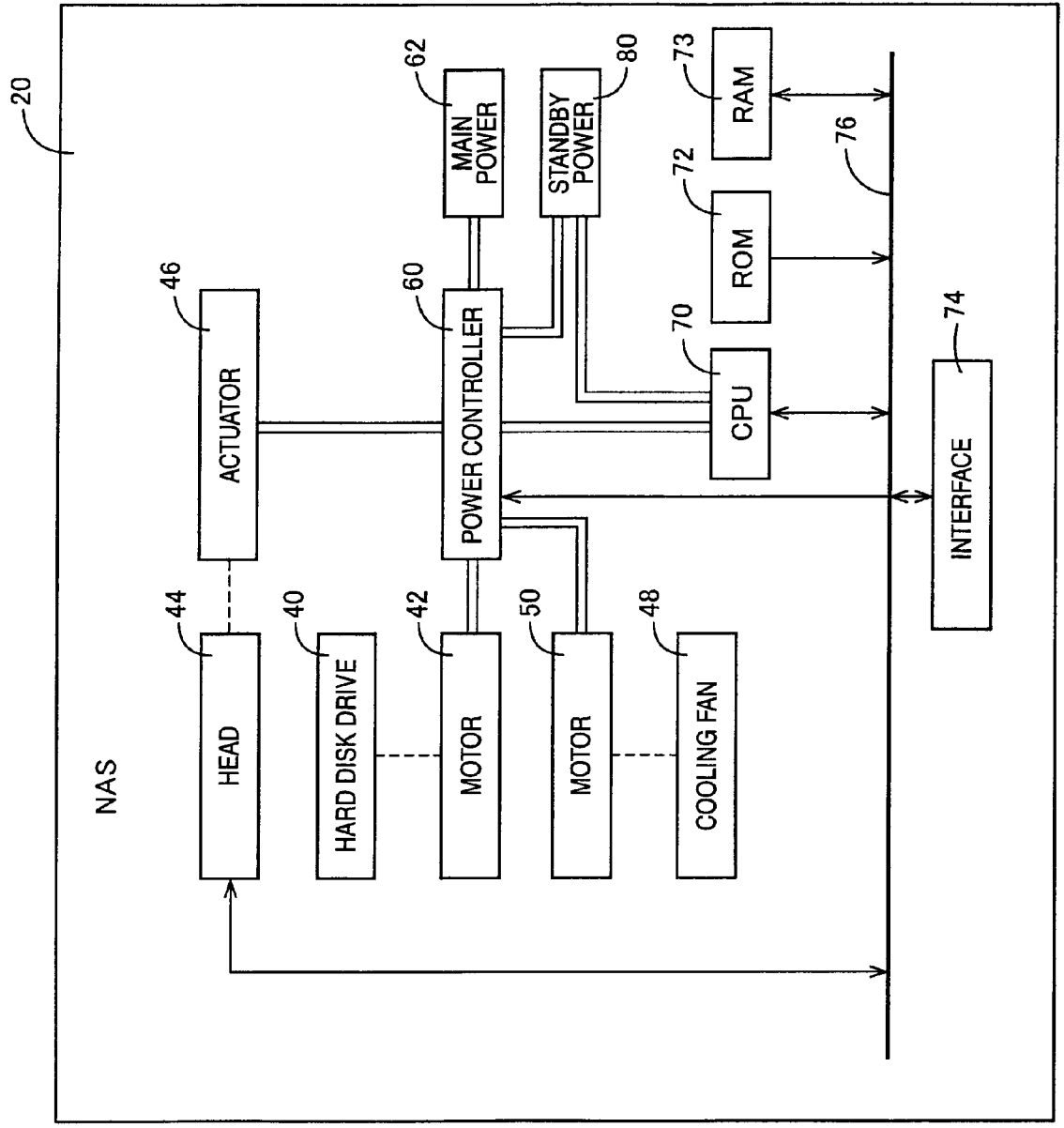
FIG. 3 is a block diagram schematically showing the hardware configuration of the NAS shown in FIG. 1.

FIG. 3 is a schematic block diagram showing the hardware structure of the NAS 20.

The NAS 20 includes: a hard disk drive 40 serving as a rotator configured to magnetically record data; and a motor 42 driven for rotating the hard disk 40.

The NAS 20 further includes a head 44 configured to read/write data from/to the hard disk drive 40 being rotated; and an actuator 46 driven for operating the head 44.

The NAS 20 further includes a cooling fan 48 configured to cool the motor 42 and a motor 50 configured to drive the cooling fan 48.

The motor 42, the actuator 46 and the motor 50 are connected to a main power 62 via a power controller 60. The motor 42, the actuator 46 and the motor 50 operate by consuming electricity supplied from the main power 62.

As shown in FIG. 3, the NAS 20 further includes: a CPU (an example processor) 70; ROM (example nonvolatile memory serving as an example of the memory) 72; RAM (example nonvolatile memory serving as another example memory) 73; and an interface 74. The CPU 70, the ROM 72, the RAM 73 and the interface 74 are interconnected via a bus 76. The bus 76 is connected to a head 44 and a power controller 60, as well.

The power controller 60 switches the state of a connection between the motor 42, the actuator 46 and the motor 50 and the main power 62 in response to a command signal from the CPU 70, between a state (namely, an ON state) where the motor 42, the actuator 46 and the motor 50 are connected to the main power 62 and a state (namely, an OFF state) where the motor 42, the actuator 46 and the motor 50 are disconnected from the main power 62.

In order to enable the power controller 60 to perform such operations at all times, the power controller 60 and the CPU 70 are always connected to a standby power source 80. Amounts of electric power from the standby power source 80 consumed by the power controller 60 and the CPU 70 are nominal, whereas amounts of electric power from the main power 62 consumed by the motors 42 and 50 are relatively large.

In the present embodiment, transition of the NAS 20 from an operating state to a halt state (i.e., deactivation) is performed in synchronism with a shift in the states of the four PCs 12 sharing the NAS 20. In the present embodiment, the transition of NAS 20 from the operating state to the halt state corresponds to a disconnection of the motor 42, the actuator 46 and the motor 50 from the main power 62.

When transition of the NAS 20 from the operating state to the halt state is completed, the hard disk drive 40, the head 44 and the cooling fan 48 are all deactivated. Consequently, consumption of power from the main power 62 is halted, and a sound and vibrations resulting from rotation of the hard disk drive 40 and the rotation of the cooling fan 48 are also stopped.

Specifically, in the present embodiment, the NAS 20 monitors operating states of all of the PCs 12. Upon detection of all of the PCs 12 being shut down, the NAS 20 turns off the main power 62.

More specifically, in the present embodiment, upon receipt of a start packet for commanding activation of the NAS 20 from any of the PCs 12, the NAS 20 registers the PC 12 in a list schematically shown in FIGS. 6A through 6E. In the meantime, upon receipt of an end packet for commanding completion of the NAS 20 from any of the PCs 12, the PC 12 is deleted from the list.

Further, in the present embodiment, when the NAS shifts to a state where none of the PCs 12 are registered in the list, the main power 62 of the NAS 20 is shut down. In the meantime, when the first PC 12 is registered in the list, the main power 62 of the NAS 20 is turned on.

In the present embodiment, in order to perform previously-described power management, the PC-side program is stored in the ROM 32 or the hard disk drives 36 of the respective PCs 12. During the course of operation of the respective PCs 12, the program is repeatedly executed by the CPU 30 in each of the PCs 12.

Figure 4:
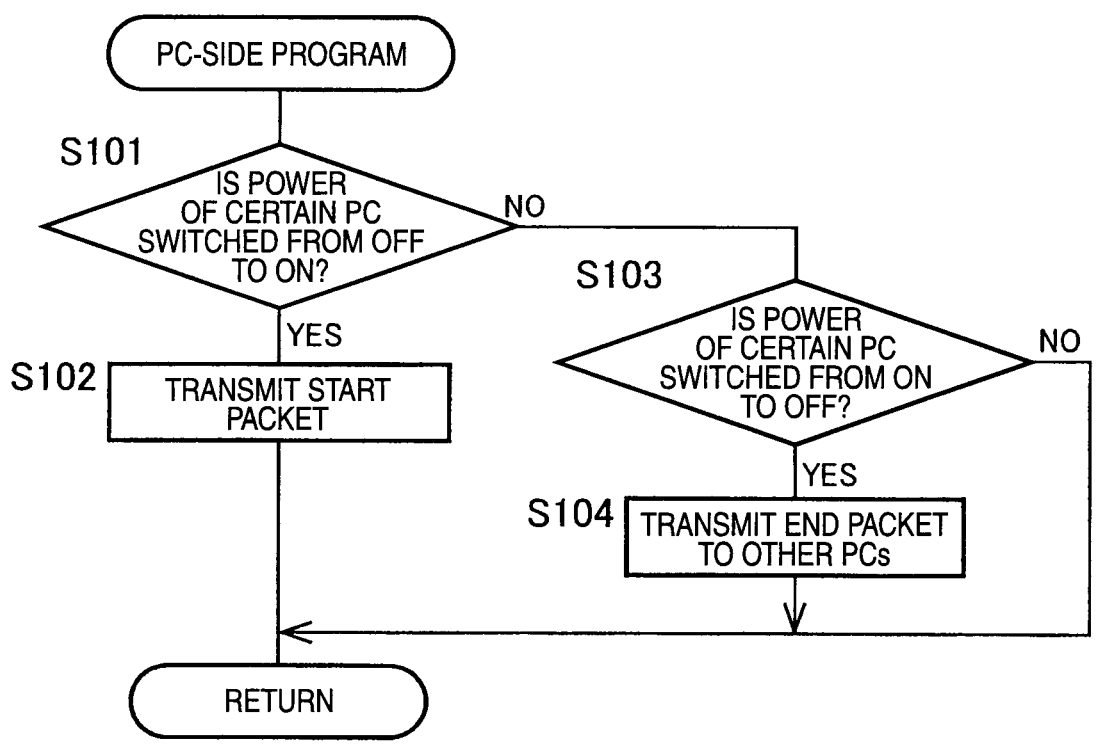
FIG. 4 is a flowchart schematically showing a PC-side program executed in each of the PCs shown in FIG. 1.

FIG. 4 is a flowchart schematically showing the PC-side program. Every time the PC-side program is executed, it is determined in step S101 whether or not the power of the certain PC has been switched from an OFF state to an ON state; namely, whether or not the user has performed power-on operation.

When the power of the certain PC 12 is switched from an OFF state to an ON state this time, the determination made in step S101 becomes YES, and the start packet is transmitted in step S102 from the certain PC 12 to the NAS 20 in association with the PC 12. For example, the PC 12 may transmit the start packet in association with device identification information such as an network address assigned to the PC 12, the device name of the PC 12, or the model number of the PC 12. After performance of processing pertaining to step S102 is completed, single execution of processing pertaining to the PC-side program ends.

In contrast, when the power of the certain PC 12 is not yet switched from an OFF state to an ON state this time, the determination made in step S101 becomes NO. It is determined in step S103 whether or not operation for switching the power of the certain PC 12 from an ON state to an OFF state has been performed; namely, whether or not the user has performed shutdown operation.

On the assumption that the operation for switching the power of the certain PC 12 from an ON state to an OFF state has been performed this time, the determination made in step S103 becomes YES. In step S104, an end packet is transmitted from the certain PC 12 toward the NAS 20 in association with the PC 12. After performance of processing pertaining to step S104 is completed, single execution of processing pertaining to the PC-side program ends.

In contrast, provided that the operation for switching the power of the certain PC 12 from an ON state to an OFF state is not yet performed this time, the determination made in step S103 becomes NO, and processing pertaining to step S104 is skipped. Thus, single execution of processing pertaining to the PC-side program ends.

In the present embodiment, in order to perform previously-described power management, the NAS-side program is stored in the ROM 72 of the NAS 20. During the course of operation of the NAS 20, processing pertaining to the program is repeatedly performed by the CPU 70.

Figure 5:
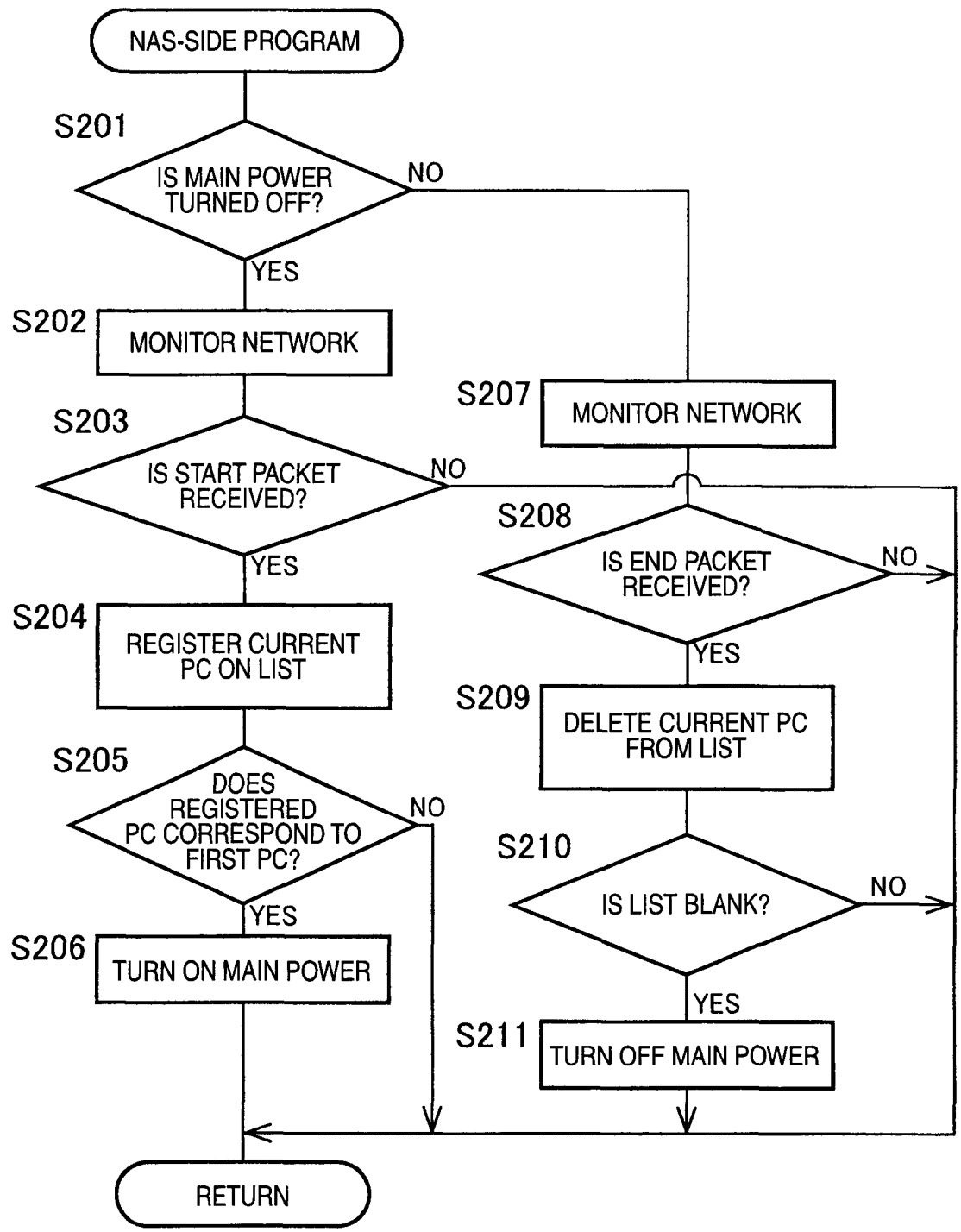
FIG. 5 is a flowchart schematically showing a NAS-side program executed in the NAS shown in FIG. 1.

FIG. 5 is a flowchart schematically showing the NAS-side program. The CPU 70 repeatedly performs processing pertaining to the NAS-side program regardless of whether the main power 62 is held in an ON state or an OFF state by the power controller 60.

Every time processing pertaining to the NAS-side program is performed, it is determined in step S201 whether or not the main power 62 is held in an OFF state by the power controller 60. A determination is made as to whether or not the main power 62 is disconnected from the motor 42, the actuator 46, and the motor 50.

When the main power 62 is held in an OFF state this time, the determination made in step S201 becomes YES, and the state of the network 14 is monitored in step S202 by means of unillustrated MAC (Media Access Control). Specifically, the NAS 20 monitors the state of the network 14 in the background this time.

Subsequently, it is determined in step S203 whether or not a start packet is received from any one of the PCs 12. Specifically, each PC 12 generates a start packet independently of the other PCs 12. Hence, every time power of the respective PCs 12 is turned on, the respective PCs 12 transmit a start packet toward the NAS 20.

When a start packet is received this time, the determination made in step S203 becomes YES. In step S204, the PC 12, which has transmitted the start packet received this time, among the four PCs 12 is registered in a list schematically shown in FIGS. 6A to 6E (the list can be stored, for example, on the RAM 73).

Figure 6:
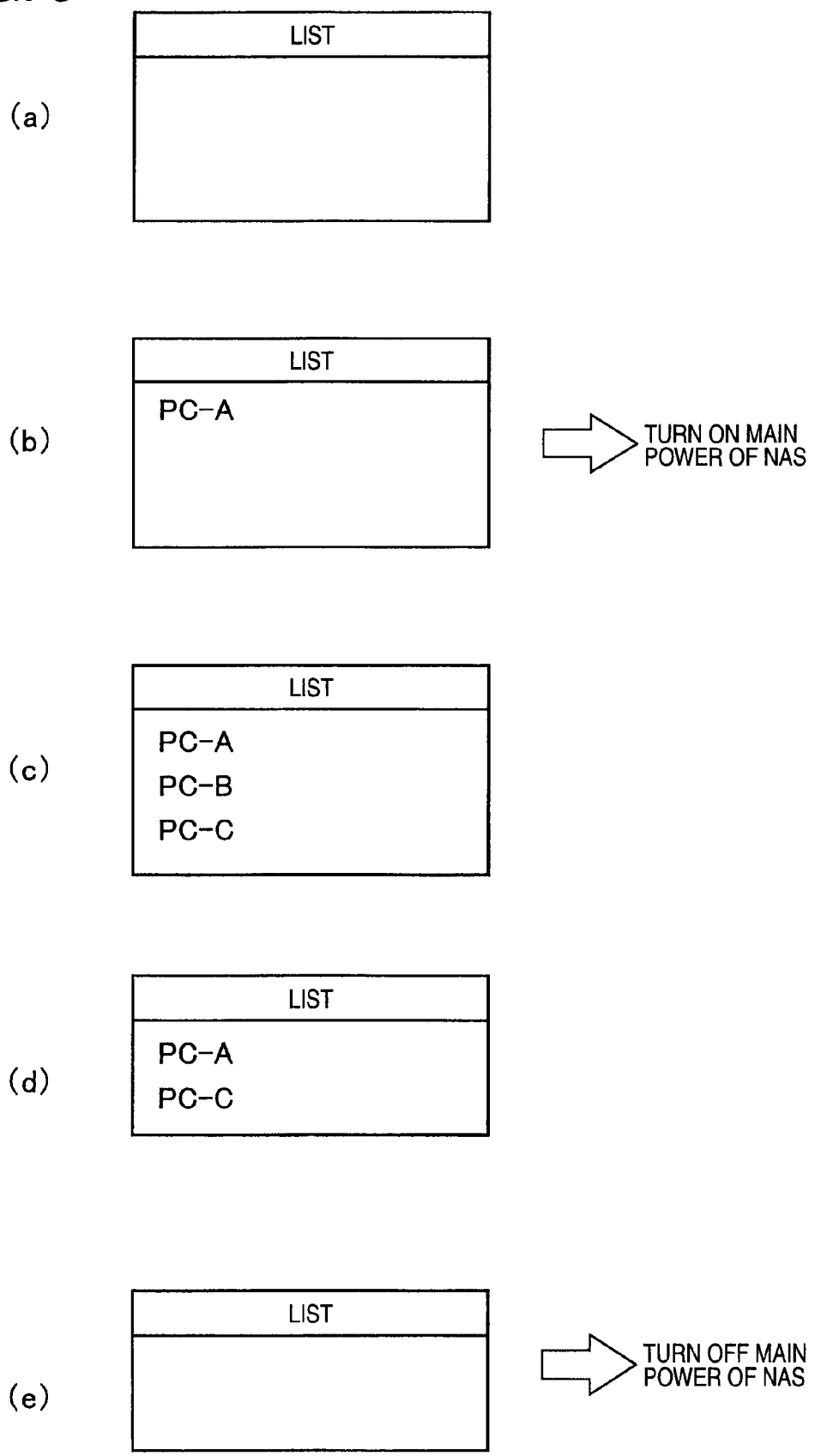
FIGS. 6A to 6E are views schematically showing a list to which a reference is made for executing the NAS-side program shown in FIG. 5, along with an example of transition in state.

FIG. 6A shows a list where none of the PCs 12 are registered, and FIG. 6B shows a list where PC-A is first registered. FIG. 6C shows a list where PC-B and PC-C are additionally registered because the PC-B and PC-C are powered up subsequently to PC-A as a result of the NAS-side program being executed a plurality of times.

Subsequently, in step S205, it is determined whether or not the PC 12 registered in the list as a result of the process in step S204 being executed this time is the first PC 12 among the four PCs 12; namely, a determination is made as to whether or not the PC 12 is the PC 12 first registered in a blank list.

For instance, as shown in FIG. 6B, when PC-A is first registered in the list, a determination made in step S205 becomes YES. In contrast, as shown in FIG. 6C, when PC-C is additionally registered in the list where PC-A and PC-B are already registered, the determination made in step S205 becomes NO for PC-C.

When the determination made in step S205 is YES this time, the main power 62 is switched, in step S206, to an ON state by the power controller 60 as in step S204. As a consequence, rotation of the hard disk drive 40 and rotation of the cooling fan 48 are resumed. After completion of performance of processing to step S206, single performance of processing pertaining to the NAS-side program ends.

In contrast, given that the determination made in step S205 is NO this time, single execution of processing pertaining to the NAS-side program ends after skipping of processing pertaining to step S206.

In the above, descriptions have been given to the case where the main power 62 is held in an OFF state by the power controller 60. However, when the main power 62 is held in an ON state by the power controller 60, the determination made in step S201 becomes NO, and the state of the network 14 is monitored in step S207 as in step S202.

Subsequently, in step S208, it is determined which one of the PCs 12 is the source of a received end packet. Each PC 12 generates an end packet independently of the other PCs 12. Hence, every time the respective PCs 12 are shut down, the respective PCs 12 transmit end packets to the NAS 20.

When the end packet is received this time, a determination made in step S208 becomes YES, and the PC 12 transmitted the end packet this time is deleted from the list in step S209. In the embodiment shown in FIGS. 6A to 6E, when, for example, PC-B, transmits the end packet, PC-B is deleted from the list. As a consequence, specifics of the list are altered from those shown in FIG. 6C to those shown in FIG. 6D.

Subsequently, in step S210, it is determined whether or not the list is blank. For instance, in the embodiment shown in FIGS. 6A to 6E, specifics of the list are altered from those shown in FIG. 6D to those shown in FIG. 6E as a result of deletion of PC-A and PC-C, and the determination made in step S210 becomes YES.

When the determination made in step S210 is YES this time, the main power 62 is switched, in step S211, to an OFF state by the power controller 60. As a consequence, rotation of the hard disk drive 40 and rotation of the cooling fan 48 are halted. After completion of performance of processing pertaining to step S211, single execution of processing pertaining to the NAS-side program ends.

In contrast, when the determination made in step S210 is NO this time, single execution of processing pertaining to the NAS-side program ends after skipping of processing pertaining to step S211.

As is evident from the above descriptions, in the present embodiment, for convenience of explanation, the NAS 20 can be conceived to serve as an example of "network-connectable device" of section (1); the plurality of PCs 12 can be conceived to serve as an examples of "a plurality of computer-related devices" in the section; a portion of the NAS 20 that performs processing pertaining to steps S201 to S204 and processing pertaining to steps S207 to S209 in FIG. 5 can be conceived to serve as an example "list management unit" in the section of the drawing; and a portion of the NAS 20 that performs processing pertaining to steps S210 and S211 in the drawing can be conceived to serve as an example of "shutdown unit."

Moreover, in the present embodiment, for convenience of explanation, a portion of the NAS 20 that performs processing pertaining to steps S208 and S209 in FIG. 5 can be conceived to serve as an example "first determination/deletion unit" in section (3); and a portion of the NAS 20 that performs processing pertaining to steps S205 and S206 in the drawing can be conceived to serve as an example of "power-on unit" in section (7).

Further, in the present embodiment, for convenience of explanation, the PC-side program shown in FIG. 4 can be conceived to serve as an example of "program" of section (12); and any of the ROM 32, the RAM 34, the hard disk drive 36, and an unillustrated external recording medium (e.g., a CD-ROM where the PC-side program is previously recorded) that records the PC-side program can be conceived to serve as an example of "recording medium" in section (14).

Moreover, in the present embodiment, for convenience of explanation, the NAS-side program shown in FIG. 5 can be conceived to serve as an example of "program" in section (13); and any of the ROM 72, the RAM 73, and an unillustrated external recording medium (e.g., a CD-ROM where the NAS-side program is previously recorded) that records the NAS-side program can be conceived to serve as an example of "recording medium" in section (14).

A second embodiment of the present invention will now be described. The present embodiment provides detailed explanations about only elements that differ from those described in connection with the first embodiment. Common elements are cited by use of the same reference symbols or designations, thereby omitting their overlapping explanations.

In the present embodiment, each of the PCs 12 transmits a start packet to the NAS 20 in association with transition from an OFF state to an ON state; namely, power-on operation performed by the user, as in the first embodiment. In contrast with the first embodiment, each of the PCs 12 further periodically transmits a start packet to the NAS 20 for the duration of an ON state in the present embodiment. So long as the respective PCs 12 operate normally, the start packet is periodically transmitted to the NAS 20.

Therefore, the NAS 20 can monitor the operating state of the PC 12 registered in the list because it first transmitted a start packet, by means of determining whether or not the start packet is subsequently received from the PC in a periodic manner.

When a certain PC 12 did no transmit an end packet because of occurrence of an a bend, the NAS 20 can ascertain that use of the NAS is not necessary for the PC 12, by means of detecting the fact that the PC 12 does not periodically transmit a start packet.

Even when a connection with a certain PC 12 is unexpectedly interrupted, the NAS 20 can ascertain that use of the NAS 20 is not necessary for the PC 12, by means of detecting that the PC 12 does not periodically transmit a start packet.

Moreover, in the present embodiment, following upon transition from an ON state to an OFF state; namely, shutdown operation performed by the user, each of the PCs 12 transmits an end packet to the NAS 20 as in the first embodiment. Consequently, in the present embodiment, the operating states of the respective PCs 12 can be monitored by means of determining whether or not the respective PCs 12 have transmitted end packets to the NAS 20 as in the first embodiment.

Figure 7:
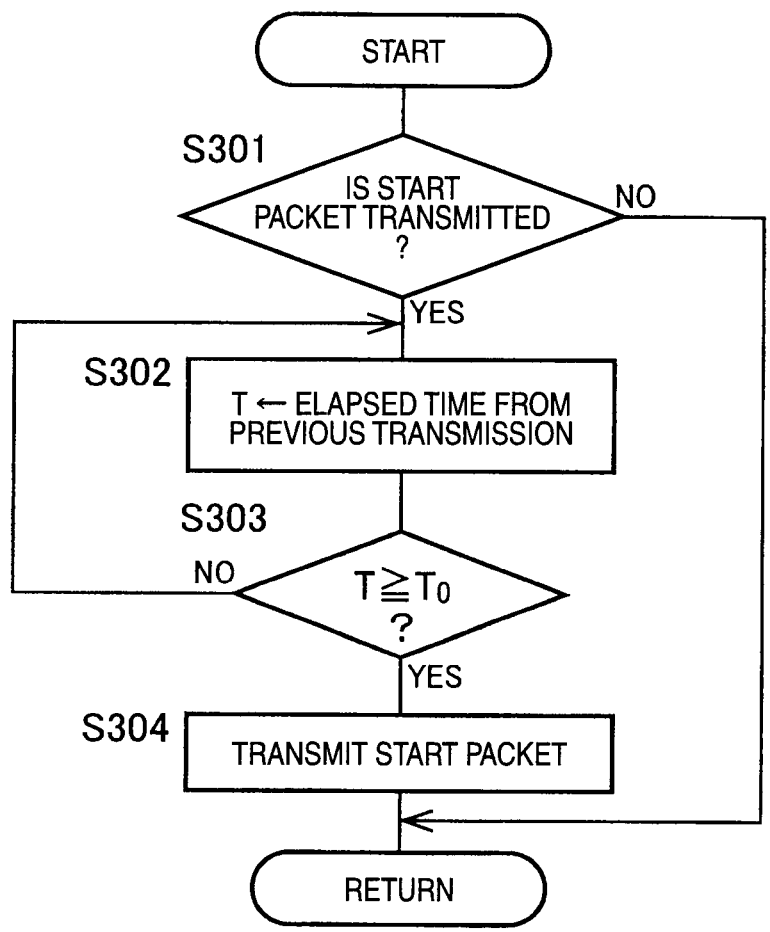
FIG. 7 is a flowchart schematically showing a periodic transmission program whose processing is executed in each of four PCs that share a NAS serving as a network-connectable device complying with a second embodiment of the present invention.

In order to fulfill monitoring of the states, the respective PCs 12 repeatedly perform processing pertaining to a periodic transmission program schematically shown in a flowchart of FIG. 7 in addition to performing processing pertaining to the PC-side program shown in FIG. 4. The NAS 20 repeatedly performs processing pertaining to an abend determination program schematically shown in a flowchart of FIG. 8 in addition to performing processing pertaining to the NAS-side program shown in FIG. 5.

Processing pertaining to the period transmission program shown in FIG. 7 is repeatedly performed by the CPU 30 in the middle of operation of the respective PCs 12.

Every time processing pertaining to the periodic transmission program is performed, a determination is first made, in step S301, as to whether or not the certain PC 12 has transmitted a start packet to the NAS 20 along with preceding power-on operation performed by the user. Given that the certain PC 12 has not yet transmitted a start packet at all, a determination made in step S301 becomes NO, and single performance of processing pertaining to the periodic transmission program immediately ends.

In contrast, provided that the certain PC 12 has already transmitted a start packet to the NAS 20 this time, the determination made in step S301 becomes YES. In step S302, a time T that has elapsed since the certain PC 12 transmitted a previous start packet is measured. Subsequently, in step S303, a determination is made as to whether or not the measured elapsed time T is equal to or longer than a period T0. When the elapsed time T is shorter than the period T0, processing returns to step S302.

When the elapsed time T comes to the period T0 or more as a result of processing pertaining to steps S302 and S303 being performed several times, a determination made in step S303 becomes YES. Subsequently, in step S304, a new start packet is transmitted to the NAS 20. As a consequence, the certain PC 12 repeatedly transmits the start packet at the period T0. Thus, single performance of processing pertaining to the periodic transmission program ends.

Figure 8:
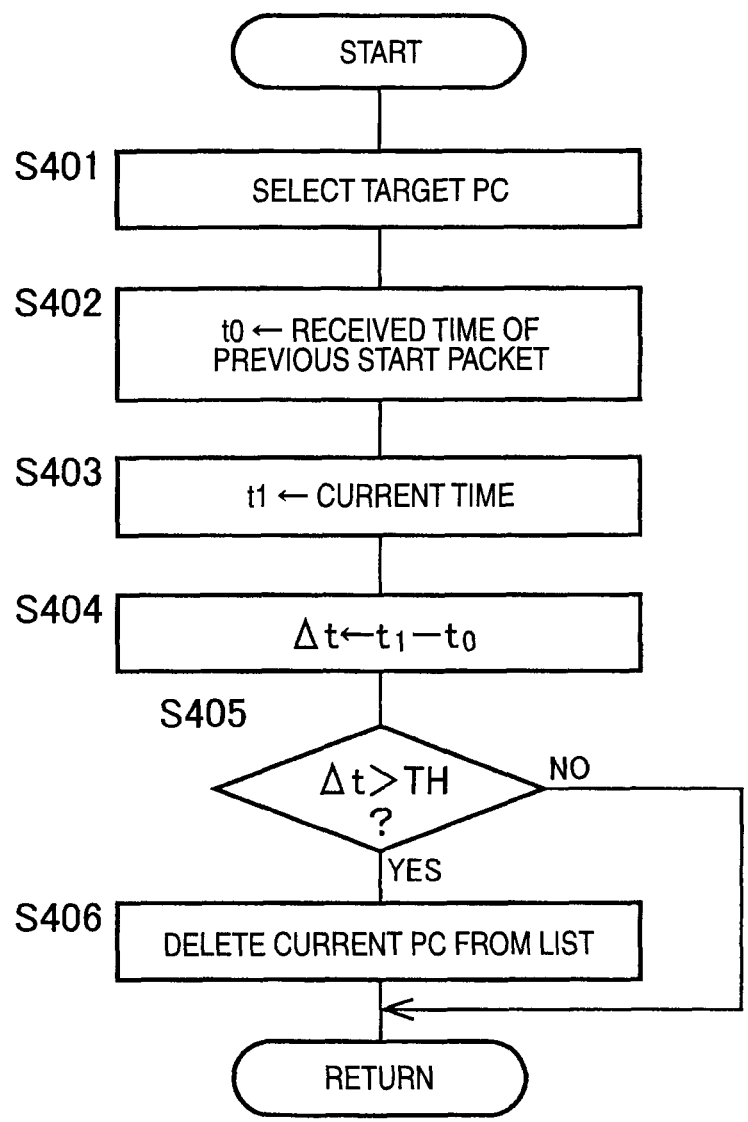
FIG. 8 is a flowchart schematically showing an abend determination program whose processing is executed by the NAS complying with the second embodiment.

Processing pertaining to the abend determination program shown in FIG. 8 is repeatedly performed by the NAS 20. Every time processing is performed, a serving as a current target PC among the four PCs 12 is first selected as a target PC in step S401. Specifically, among the four PCs 12, any of the PCs registered in the list are sequentially, cyclically selected as a target PC.

In step S402, the time at which the NAS 20 received the previous start packet from the current target PC is measured as a receive time t0 and stored on the RAM 73. The receive time t0 is updated every time the NAS 20 receives the start packet. Next, in step S403, a current time t1 is measured. In step S404, there is computed a time Δt elapsed from the time t0 at which the previous start packet was received until the current time t1.

Subsequently, in step S405, a determination is made as to whether or not the thus-computed elapsed time Δt is greater than a threshold value TH. The threshold value TH is previously set so as to have a period that is longer than the foregoing period T.

Provided that the elapsed time Δt is equal to or smaller than the threshold value TH this time, a determination made in step S405 becomes NO, and single performance of processing pertaining to the abend determination program ends. In contrast, provided that the elapsed time Δt is greater than the threshold value TH this time, the determination made in step S405 becomes YES. In step S406, the current target PC is determined to have caused an abend; namely, the PC is determined to have ended periodic transmission of a start packet before transmission of the end packet, and hence the target PC is deleted from the list. Thus, single performance of processing pertaining to the abend determination program ends.

Figure 9:
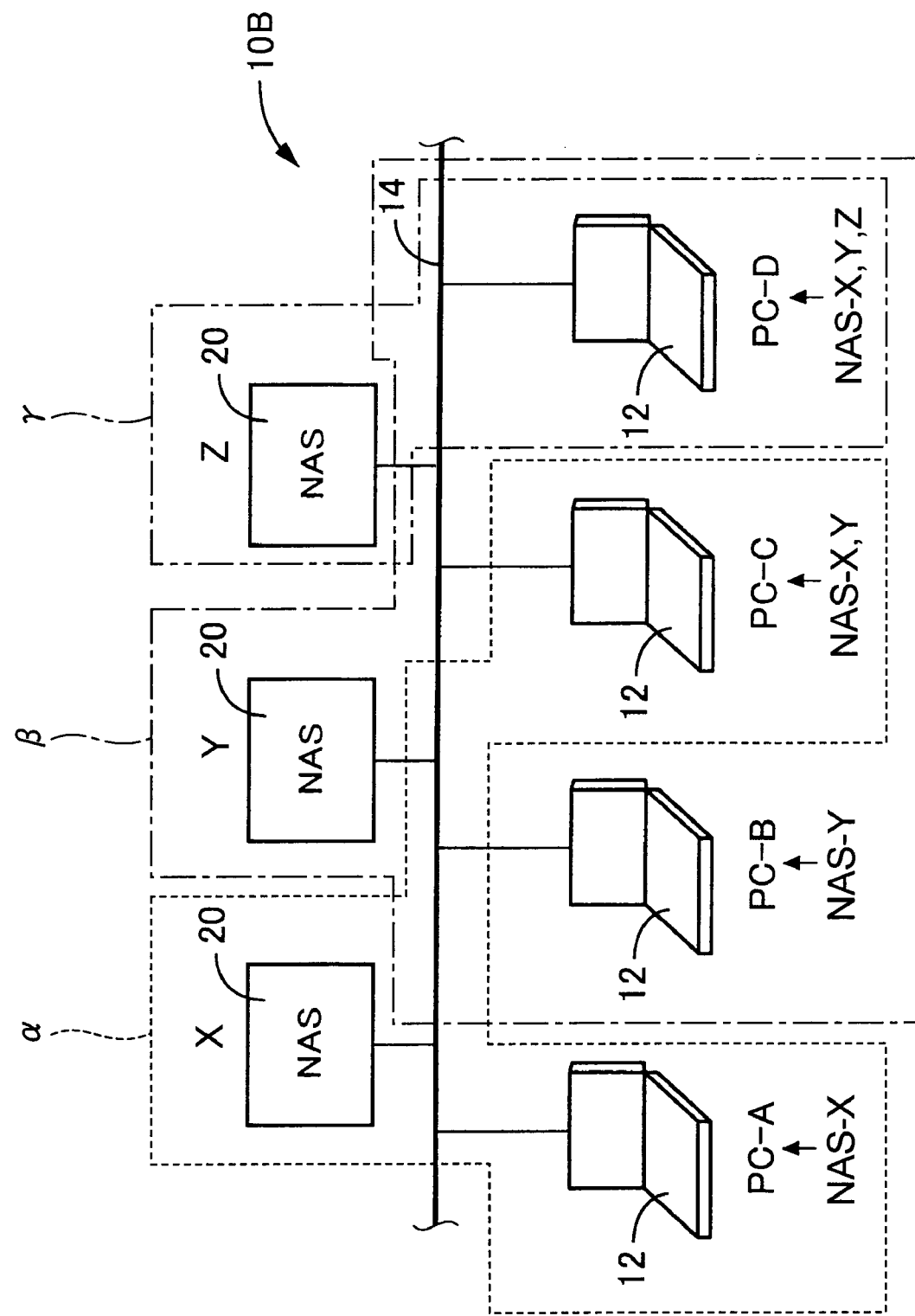
FIG. 9 is a schematic diagram showing another network system using the NAS.

As is evident from the foregoing descriptions, in the present embodiment, for convenience of explanation, a portion of the NAS 20 that performs processing pertaining to steps S201 to S204 and processing pertaining to steps S207 to S209 shown in FIG. 5 and a portion of the NAS 20 that performs processing pertaining to steps S401 to S406 shown in FIG. 9 can be conceived to serve as an example of "list management unit" in section (1).

Moreover, in the present embodiment, for convenience of explanation, a portion of the NAS 20 that performs processing pertaining to steps S401 through 406 in FIG. 8 can be conceived to serve as an example of "second determination-and-deletion unit" in section (5).

Further, in the present embodiment, for convenience of explanation, the PC-side program shown in FIG. 4 and the periodic transmission program shown in FIG. 7 can be conceived to cooperated to serve as an example of "program" of section (12); and any of the ROM 32, the RAM 34, the hard disk drive 36, and an unillustrated external recording medium (e.g., a CD-ROM where the PC-side program is previously recorded) that records the PC-side program can be conceived to serve as an example of "recording medium" in section (14).

Moreover, in the present embodiment, for convenience of explanation, the NAS-side program shown in FIG. 5 and the abend determination program shown in FIG. 8 can be conceived to cooperated to serve as an example of "program" in section (13); and any of the ROM 72, the RAM 73, and an unillustrated external recording medium (e.g., a CD-ROM where the NAS-side program is previously recorded) that records the NAS-side program can be conceived to serve an example of "recording medium" in section (14).

In some of the above-described embodiments, the NAS is selected as a network-connectable device. However, the present invention can be implemented by selection of another storage device (e.g., memory of a type not having a movable section for data storage purpose), another network-related device (e.g., a router, and the like), home electrical appliances (e.g., a media player, a TV set, a refrigerator, and the like), or office device (e.g., a printer, a copier, and the like), in place of or in addition to the NAS.

Moreover, in some of the above-described embodiments, a PC is selected as computer-related device. However, the present invention can be implemented by selection of home electrical appliances (e.g., a reproducing device configured to reproduce an image or a sound such as a media player or a TV set, a refrigerator, and the like) or office device (e.g., a printer, a copier, and the like) in place of or in addition to the NAS.

In the above embodiments, the NAS 20 (i.e., the network-connectable device) performs the registration and deletion on the list in response to the power-on operation and shutdown operation of the PCs 12 (i.e., the computer-related device). However, the present invention is not limited thereto.

For example, each of the PCs 12 may transmit the start command signal to the NAS 20 for instructing an activation of the NAS 20 when the PC 12 performs connection operation to the network 14, and the NAS 20 may register the PC 12 on the list on receipt of the start command signal.

Further, when the PC 12 registered on the list is switched to or is to be switched to a disconnected state in which the PC 12 is disconnected from the network 14, the NAS 20 may delete the PC 12 from the list.

Specifically, the PC 12 may transmit a disconnection notification signal to the NAS 20 when the PC 12 is to be disconnected from the network 14 (e.g., disconnection command is input to the PC 12), and the NAS 20 may determine the PC 12 is to be switched to be disconnected from the network on receipt of the disconnection notification signal and may delete the PC 12 from the list.

Alternatively, the PC 12 may periodically transmit the start command during operations of the PC 12, and when the NAS 20 does not receive the start command signal from the PC 12 registered on the list over a predetermined time period, the NAS 20 may determine that the PC 12 has been switched to the disconnected state and may delete the PC 12 from the list.

In the above embodiment, FIG. 1 shows the network system 10 with a single network 14. However, a plurality of networks may be provided in a same network.

As shown in FIG. 9, the network system 10B includes PCs 12 (PC-A, PC-B, PC-C and PC-D) and NASs 20 (NAS-X, NAS-Y and NAS-Z). In this regard, PC-A, PC-B, PC-C, PC-D, NAS-X, NAS-Y and NAS-Z are connected to the (same) network 14. Incidentally, for each of the PC-A, PC-B, PC-C and PC-D, the connectable NAS (s) 20 may be set. In the example shown in FIG. 9, the PC-A is set to be connectable to the NAS-X, the PC-B is set to be connectable to the NAS-Y, the PC-C is set to be connectable to NAS-X and NAS-Y, and the PC-D is set to be connectable to NAS-X, NAS-Y and NAS-Z. In other words, the NAS-X, NAS-Y and NAS-Z may be shared by different PC groups, respectively.

In this case, although the network system 10B may be interpreted as including a single network 14, but the network system 10B may be interpreted as including three networks respectively corresponding to the NASs 20, that is, a network α including the NAS-X and the PC-A, PC-C and PC-D, a network β including the NAS-Y and the PC-B, PC-C and PC-D, and a network γ including the NAS-Z and the PC-D.

When the system of the embodiments applied to this network system 10B, for example, when the PC-B is connected to the network β(or the PC-B is connected to the network 14, or the PC-B is activated), the NAS-Y is powered on. When no PCs 12 is connected to the network β(or no PC is connected to the network 14, or no PC is activated), the NAS-Y is powered off.

Although some of the embodiments of the present invention have been described in detail by reference to the drawings, the embodiments are illustrative. The present invention can be implemented in other forms, including the modes described in connection with "Disclosure of the Invention", that are contrived by making various alterations or modifications to the present embodiments on the basis of the knowledge of the skilled persons.

What is claimed is:

1. A network-connectable device configured to communicate with a plurality of computer-related devices via a network, said network-connectable device comprising:
   a list management unit configured to:
      register the plurality of computer-related devices connected to the network-connectable device via the network on a list when the list management unit receives a start command signal instructing an activation of the network-connectable device transmitted from the plurality of computer-related devices via the network; and
      delete each of the plurality of computer-related devices from the list when each of the plurality of computer-related devices registered on the list is switched to or is to be switched to a disconnected state from the network-connectable device; and
   a shutdown unit configured to shut down power to a part of the network-connectable device when all of the plurality of computer-related devices connected to the network-connectable device via the network are deleted from the list.

2. The network-connectable device according to claim 1, wherein the list management unit is configured to delete each of the plurality of computer-related devices from the list when each of the plurality of computer-related devices is shut down or is to be shut down.

3. The network-connectable device according to claim 1, wherein the list management unit comprises a first determination/deletion unit configured to:
   determine that at least one of the plurality of computer-related devices is to be switched to be disconnected from the network when the list management unit receives a disconnection notification signal transmitted from the at least one of the plurality of computer-related devices which indicates that the at least one of the plurality of computer-related devices is to be disconnected from the network; and
   delete the at least one of the plurality of computer-related devices outputting the notification signal from the list.

4. The network-connectable device according to claim 1, wherein the start command is periodically transmitted by each of the plurality of computer-related devices during operations thereof,
   wherein the list management unit comprises a second determination/deletion unit configured to:
      determine that at least one of the plurality of computer-related devices is switched to the disconnected state when the start command signal from the at least one of the plurality of computer-related devices registered on the list is not received over a predetermined time period; and
      delete the at least one of the plurality of computer-related devices from the list.

5. The network-connectable device according to claim 1, further comprising:
   a power-on unit configured to turn on the power when at least one of the plurality of computer-related devices is registered on the list on which none of the plurality of computer-related devices have been registered.

6. The network-connectable device according to claim 1, further comprising:
   a motor as a drive source, wherein the shutdown unit is configured to shutdown the power to the motor.

7. The network-connectable device according to claim 6, further comprising;
   a storage device that comprises a data-recordable hard disk driven by the motor.

8. The network-connectable device according to claim 1, further comprising:
   a reproducing device configured to reproduce an image or a sound, wherein the shutdown unit is configured to shutdown the power to the reproducing device.

9. The network-connectable device according to claim 1, wherein the plurality of computer-related devices comprise at least one of a desktop computer, a portable computer and a digital home electrical appliance.

10. The network-connectable device according to claim 1, further comprising:
    a first power source;
    a second power source
    a first unit operable on power supplied from the first power source;
    a second unit operable on power supplied from the second power source, the second unit comprising the list management unit and the shutdown unit,
    wherein the shutdown unit is configured to shut down the power from the first power source to the first unit.

11. A power management method for a network-connectable device configured to communicate with a plurality of computer-related devices via a network, said method comprising:
    registering the plurality of computer-related devices connected to the network-connectable device via the network on a list when the network-connectable device receives a start command signal instructing the network-connectable device to activate which is transmitted from the plurality of computer-related devices via the network;
    deleting each of the plurality of computer-related devices from the list when each of the plurality of computer-related devices registered on the list is switched to or is to be switched to a disconnected state disconnected from the network; and
    shutting down power to a part of the network-connectable device when all of the plurality of computer-related devices connected to the network-connectable device via the network are deleted from the list.

12. A non-transitory computer-readable recording medium including computer program instructions, which when executed by a network-connectable device configured to communicate with a plurality of computer-related devices via a network, cause the network-connectable device to perform a power management method comprising:
    registering the plurality of computer-related devices connected to the network-connectable device via the network on a list when the network-connectable device receives a start command signal transmitted from the plurality of computer-related devices via the network instructing the network-connectable device to activate;
    deleting each of the plurality of computer-related devices from the list when each of the plurality of computer-related devices registered on the list is switched to or is to be switched to a disconnected state from the network; and
    shutting down power to a part of the network-connectable device when all of the plurality of computer-related devices connected to the network-connectable device via the network are deleted from the list.

13. The network-connectable device according to claim 1, wherein
    the start command is periodically transmitted by each of the plurality of computer-related devices during operations, and
    the list management unit comprises a determination/deletion unit, the determination/deletion unit including:
       a selection unit configured to select one of the at least one of the plurality of computer-related devices registered on the list sequentially and cyclically, as a current target computer-related device;
       a measurement unit configured to measure a time to, at which the network-connectable device previously received the start command signal from the current target computer-related device;
       a processor configured to compute an elapsed time $\Delta t$ from the time $t0$ to a current time $t1$; and
       a deletion unit configured to delete the current target network-related device from the list when the elapsed time $\Delta t$ becomes greater than a predetermined time period.

* * * * *